Patented Nov. 13, 1928.

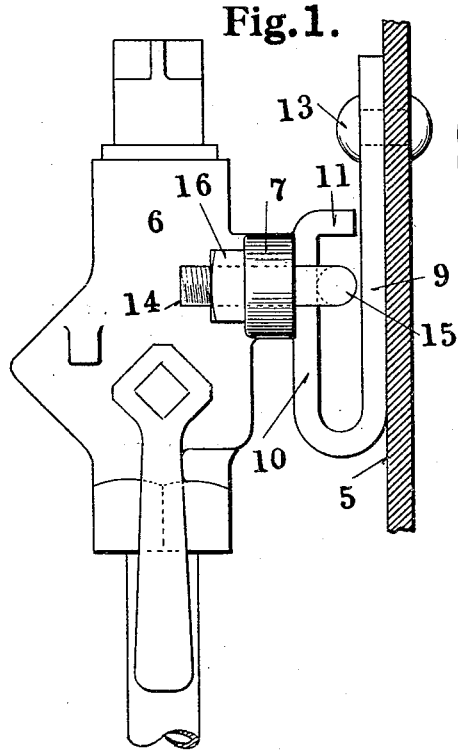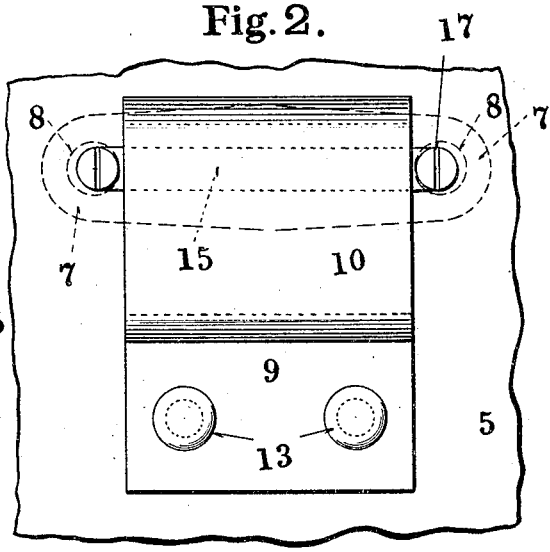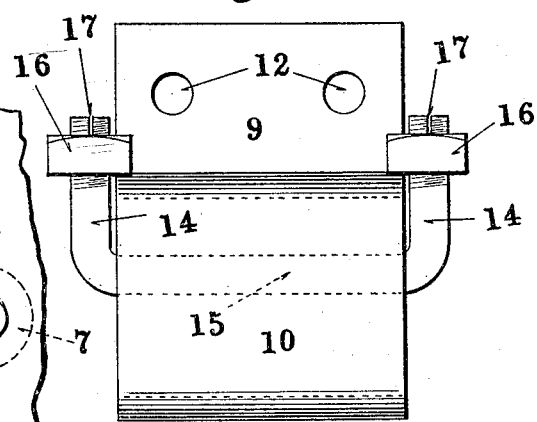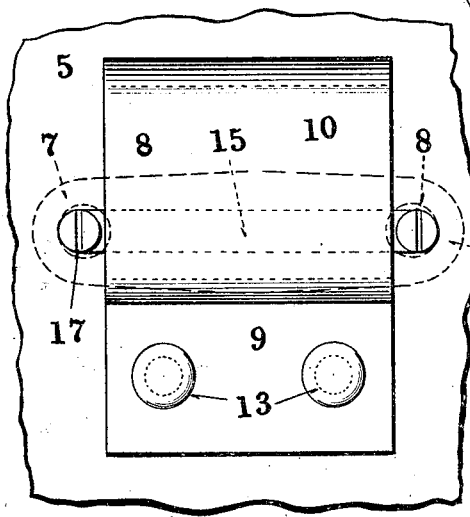

1,691,784

UNITED STATES PATENT OFFICE.

FRANK H. PIETZSCH AND STERLING H. CAMPBELL, OF ST. LOUIS, MISSOURI, ASSIGNORS TO WESTERN RAILWAY EQUIPMENT COMPANY, OF ST. LOUIS, MISSOURI, A CORPORATION OF MISSOURI.

RETAINING-VALVE HOLDER.

Application filed October 3, 1927. Serial No. 223,828.

Our invention relates to a retaining valve holder and has for its object the production of a holder which while effective in operation and permitting the necessary adjustments will be of the simplest possible construction. In carrying out our invention we employ a unitary bracket in connection with valve securing means, preferably in the form of a U-bolt, which may be inserted through the loop of the bracket but which is inseparable therefrom when the nuts are applied so that the device may be shipped without liability of loss of the parts.

In the accompanying drawings, which illustrate one form of retainer valve holder made in accordance with our invention, Figure 1 is a side elevation; Figure 2 is a front view, the bracket being in inverted position and the retainer valve lugs being shown in broken lines. Figure 3 is a view similar to Figure 2 but showing the U-bolt in a different position in the loop; and Figure 4 is a view showing the device detached and in condition for shipment.

The numeral 5 indicates a part of the end of a railway car and 6 a valve provided with the usual lugs 7 having bolt holes 8. We form the bracket from a metal strap 9 by bending over a portion 10 parallel with the body of the strap to provide a loop and bending down the end 11 to close the loop. Formed in the end of the strap projecting beyond the loop are a pair of holes 12 for fastening the bracket to the car end by means of bolts or rivets 13. The projecting end of the strip containing the holes 12 may be allowed to project upwardly, as shown in Figure 1, or downwardly, as shown in Figures 2 and 3.

In order to secure the retainer valve to the bracket we provide a U-bolt comprising a pair of arms 14 and a connecting part 15. The arms 14 are threaded at their outer ends to receive nuts 16 and are provided with slots 17 so that they may be spread to form nut locks. The length of the arms 14 is such that when the nuts are removed one of the arms may be passed laterally through the loop of the bracket to assemble the parts. The parts are so proportioned and related, however, that after the nuts have been placed in position on the U-bolt, as shown in Figure 4, the parts cannot be separated. This is owing to two features either of which alone would accomplish the result. First, the width of the strap 9, with respect to the length of the connecting part 15 of the U-bolt, is such that the nuts cannot move into alignment with the open sides of the loop; second, the depth of the loop i. e. the distance between the parts 9 and 10 is less than the smallest diameter of the nuts and hence the nuts would not pass through the loop even if they could be brought into alignment with the open sides of the loop.

It will be seen that our retainer valve holder is of the simplest construction, that it obviates adjustment for variation in the valve holes, and that the length of the bracket loop provides ample vertical adjustment to compensate for variations in the length of the valve pipe. Furthermore, the ample vertical adjustment in connection with the ready reversibility of the bracket enables the device to be applied to cars on which fastening devices of different form would interfere with other devices.

Having fully described our invention, what we claim as new and desire to secure by Letters Patent of the United States is:

1. In a device of the class described, the combination with a plate adapted to be secured to a railway car, said plate having a portion bent over to form an integral loop and an end bent down to close the loop, of a U-bolt adapted to be inserted through the loop, and nuts engaging the U-bolt, the parts being so proportioned and related that said nuts will prevent the bolt from passing out of the loop.

2. In a device of the class described, the combination with a plate adapted to be secured to a car and having a portion bent over to form an integral closed loop, of fastening means adapted to be inserted laterally through said loop and provided with integral ends passing through the lug holes of a retainer valve.

3. In a device of the class described, the combination with a plate adapted to be secured to a car and having a portion bent over to form an integral closed loop, of a U-bolt adapted to be inserted laterally through said loop when its ends lie in the plane of the plate and to engage with the lug holes of a retainer valve when said ends are at right angles to said plate.

4. In a device of the class described, the combination with a plate adapted to be secured to a railway car, said plate having a portion bent over to form an integral loop and an end bent down to close the loop of a U-bolt adapted to be inserted through the loop, and nuts engaging the U-bolt.

In testimony whereof, we hereunto affix our signatures, this 30th day of September, 1927.

FRANK H. PIETZSCH.
STERLING H. CAMPBELL.